United States Patent [19]

Varrassi

[11] Patent Number: 5,662,797
[45] Date of Patent: Sep. 2, 1997

[54] FINE MESH PRE-FILTER

[76] Inventor: Anthony Varrassi, 680 Reeceville Rd., Coatsesville, Pa. 19320

[21] Appl. No.: 642,931

[22] Filed: May 6, 1996

[51] Int. Cl.$^6$ .................................................. E04H 4/16
[52] U.S. Cl. .......................... 210/169; 210/232; 210/495; 210/497.01
[58] Field of Search ................................ 210/169, 232, 210/335, 416.2, 495, 497.01

[56] References Cited

U.S. PATENT DOCUMENTS

| | | | |
|---|---|---|---|
| 2,900,079 | 8/1959 | Pace | 210/169 |
| 3,034,653 | 5/1962 | Ward | 210/169 |
| 3,168,470 | 2/1965 | Rhoda | 210/169 |
| 3,173,865 | 3/1965 | Bosico | 210/169 |
| 3,184,764 | 5/1965 | West | 210/169 |
| 4,545,906 | 10/1985 | Frederick | 210/169 |
| 5,133,854 | 7/1992 | Horvath | 210/169 |

*Primary Examiner*—Neil McCarthy
*Assistant Examiner*—Theodore M. Green

[57] ABSTRACT

A fine mesh pre-filter for use in association with an exisiting swimming pool filter, the apparatus comprises a filter disc, the filter disc including a plurality of apertures extending therethrough; and an outer binding being affixed to the filter disc, in an operative orientation the filter disc being positioned upon an existing pool filter, the outer binding securing the filter disc to the pool filter, the filter disc filtering water before it is filtered by the pool filter thereby minimizing contamination of the existing pool filter.

1 Claim, 3 Drawing Sheets

FINE MESH PRE-FILTER

BACKGROUND OF THE INVENTION

1. Field of the Invention

The present invention relates to a fine mesh pre-filter and more particularly pertains to filtering dirty swimming pool water through the pre-filter to aviod contaminating the existing pool filter.

2. Description of the Prior Art

The use of water cleaning devices is known in the prior art. More specifically, water cleaning devices heretofore devised and utilized for the purpose of cleaning debris from swimming pools are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,820,411 to Lempio discloses a swimming pool skimmer.

U.S. Pat. No. 4,798,670 to Treene discloses a skimmer vacuum filter apparatus.

U.S. Pat. No. Des. 344,614 to Cheng discloses a water cleaning device.

U.S. Pat. No. 4,303,425 to Cox, Jr. discloses a filter bag assembly.

U.S. Pat. No. 3,969,248 to Whitmer discloses a pool filtering system.

U.S. Pat. No. Des. 318,986 to DeCoster et al. discloses a sifter or the like.

While these devices fulfill their respective, particular objective and requirements, the aforementioned patents do not describe a fine mesh pre-filter for filtering dirty swimming pool water through the pre-filter to avoid contaminating the existing pool filter.

In this respect, the fine mesh pre-filter according to the present invention substantially departs from the conventional concepts and designs of the prior art, and in doing so provides an apparatus primarily developed for the purpose of filtering dirty swimming pool water through the pre-filter to aviod contaminating the existing pool filter.

Therefore, it can be appreciated that there exists a continuing need for new and improved fine mesh pre-filter which can be used for filtering dirty swimming pool water through the pre-filter to aviod contaminating the existing pool filter. this regard, the present invention substantially fulfills this need.

SUMMARY OF THE INVENTION

In the view of the foregoing disadvantages inherent in the known types of water cleaning devices now present in the prior art, the present invention provides an improved fine mesh pre-filter. As such, the general purpose of the present invention, which will be described subsequently in greater detail, is to provide a new and improved fine mesh pre-filter and method which has all the advantages of the prior art and none of the disadvantages.

To attain this, the present invention essentially comprises a new and improved fine mesh pre-filter for use in assocaition with an exisiting swimming pool filter, the apparatus comprising, in combination: a filter disc being fabricated of fine mesh plastic and formed in a generally circular configuration with a periphery and an outer diameter, the filter disc including a plurality of generally rectangular apertures extending therethrough; and an outer binding fabricated of rubber and formed as an O-ring, the outer binding having an outer diameter and being affixed to the periphery of the filter disc, the diameter of the outer binding being slightly larger than the diameter of the filter disc, in an operative orientation the filter disc being postioned upon an existing pool filter, the outer binding securing the filter disc to the pool filter, the filter disc filtering water before it is filtered by the pool filter thereby minimizing contamination of the existing pool filter.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fine mesh pre-filter which has all the advantages of the prior art water cleaning devices and none of the disadvantages.

It is another object of the present invention to provide a new and improved fine mesh pre-filter which may be easily and efficiently manufactured and marketed.

It is a further object of the present invention to provide a new and improved fine mesh pre-filter which is of durable and reliable construction.

An even further object of the present invention is to provide a new and improved fine mesh pre-filter which is susceptible of a low cost of manufacture with regard to both materials and labor, and which accordingly is then susceptible of low prices of sale to the consuming public, thereby making such a fine mesh pre-filter economically available to the buying public.

Still yet another object of the present invention is to provide a new and improved fine mesh pre-filter which provides in the apparatuses and methods of the prior art some of the advantages thereof, while simultaneously overcoming some of the disadvantages normally associated therewith.

Even still another object of the present invention is to provide a new and improved fine mesh pre-filter for filtering dirty swimming pool water through the pre-filter to aviod contaminating the existing pool filter.

Lastly, it is an object of the present invention to provide a new and improved fine mesh pre-filter for use in associaition with an exisiting swimming pool filter, the apparatus comprises a filter disc, the filter disc including a plurality of apertures extending therethrough; and an outer binding being affixed to the filter disc, in an operative orientation the filter disc being postioned upon an existing pool filter, the outer binding securing the filter disc to the pool filter, the filter disc filtering water before it is filtered by the pool filter thereby minimizing contamination of the existing pool filter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
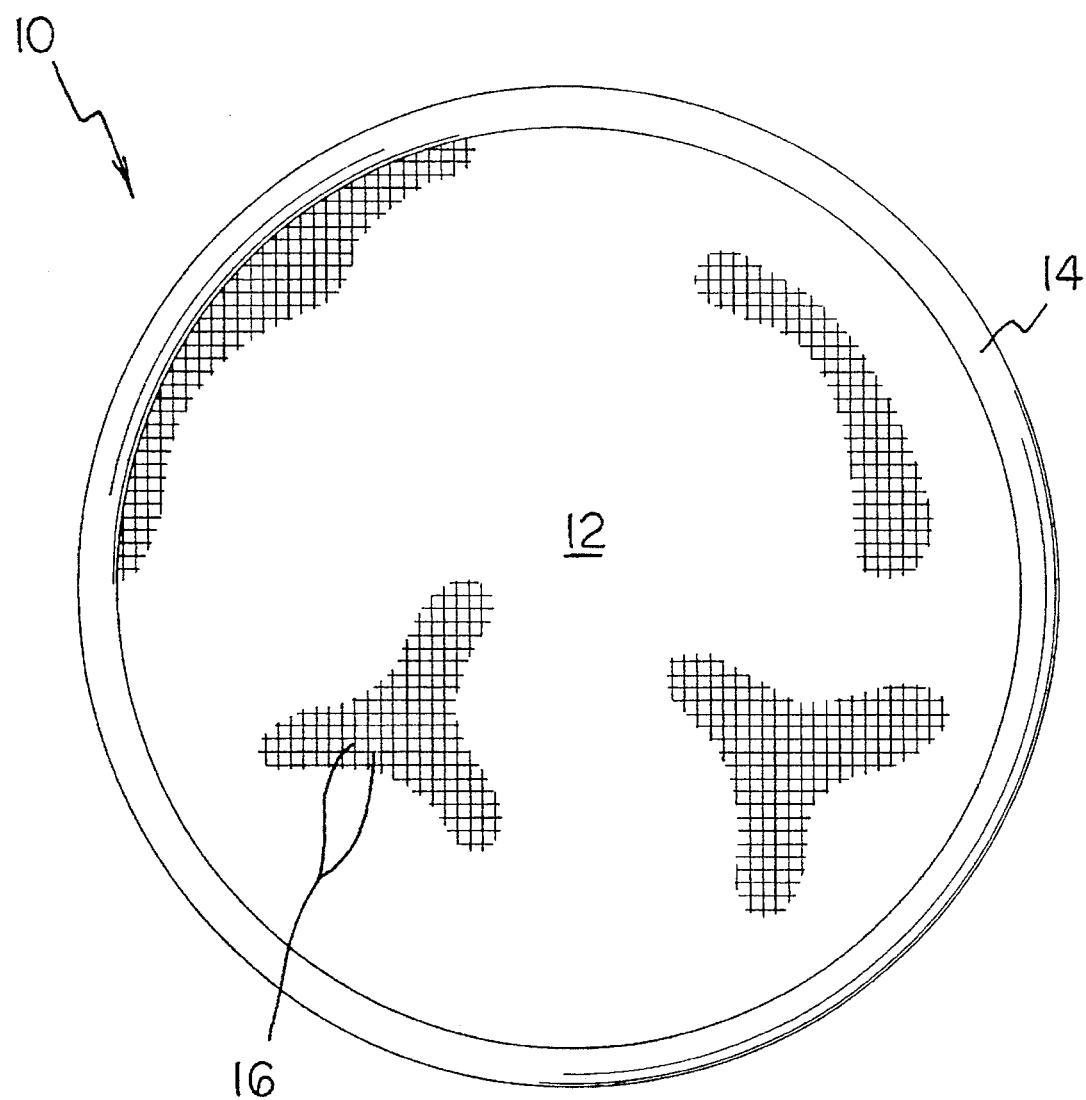
FIG. 1 is a perspective view of the preferred embodiment of the fine mesh pre-filter constructed in accordance with the principles of the present invention.

With reference now to the drawings, and in particular, to FIG. 1 thereof, the preferred embodiment of the new and improved fine mesh pre-filter embodying the principles and concepts of the present invention and generally designated by the reference number 10 will be described.

Specifically, it will be noted in the various Figures that the device relates to a fine mesh pre-filter for filtering dirty swimming pool water. In its broadest context, the device consists of a filter disc 12 and an outer binding 14. Such components are individually configured and correlated with respect to each other so as to attain the desired objective.

The fine mesh pre-filter 10 is adapted for use in associaition with an exisiting swimming pool filter. In the preferred embodiment, the existing swimming pool filter would be formed in an elongated generally cylindrical configuration with an open top and an enclosed bottom.

In the preferred embodiment the filter disc 12 is fabricated of fine mesh plastic. In alternate embodiments, the filter is fabricated of metal. The filter disc is formed in a generally circular configuration with a periphery and an outer diameter. The filter disc includes a plurality of generally rectangular apertures 16.

Figure 2:
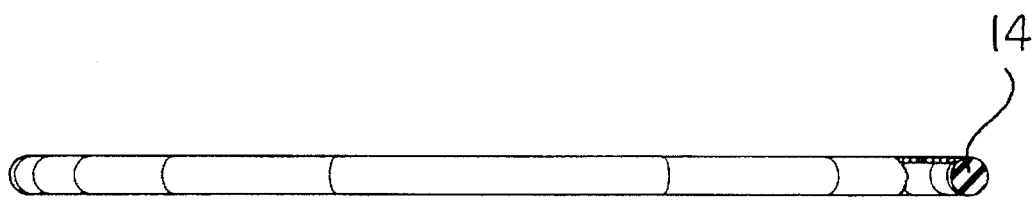
FIG. 2 is a side perspective view of the apparatus illustrating the rubber O-ring.

The outer binding 14 is fabricated of rubber and formed as an O-ring. The outer binding has an outer diameter and is affixed to the periphery of the filter disc 12. The diameter of the outer binding is slightly larger than the diameter of the filter disc. In an operative orientation the filter disc is postioned around the open top of an existing pool filter. The outer binding 14 secures the filter disc to the pool filter. The filter disc filters pool water before it is filtered by the pool filter thereby minimizing contamination of the existing pool filter. Note FIGS. 1 and 2.

The pre-filter prolongs the life of the existing filter. Since users clean the pool filter by spraying it with water, the apparatus also saves water, since it reduces the number of pool filter cleanings needed. Additionally, pool chemicals, such as chorine act more effectively with the pre-filter. The apparatus also limits the amount of time that a user cleans the existing pool filter. Note FIGS. 1 and 2.

Figure 3:
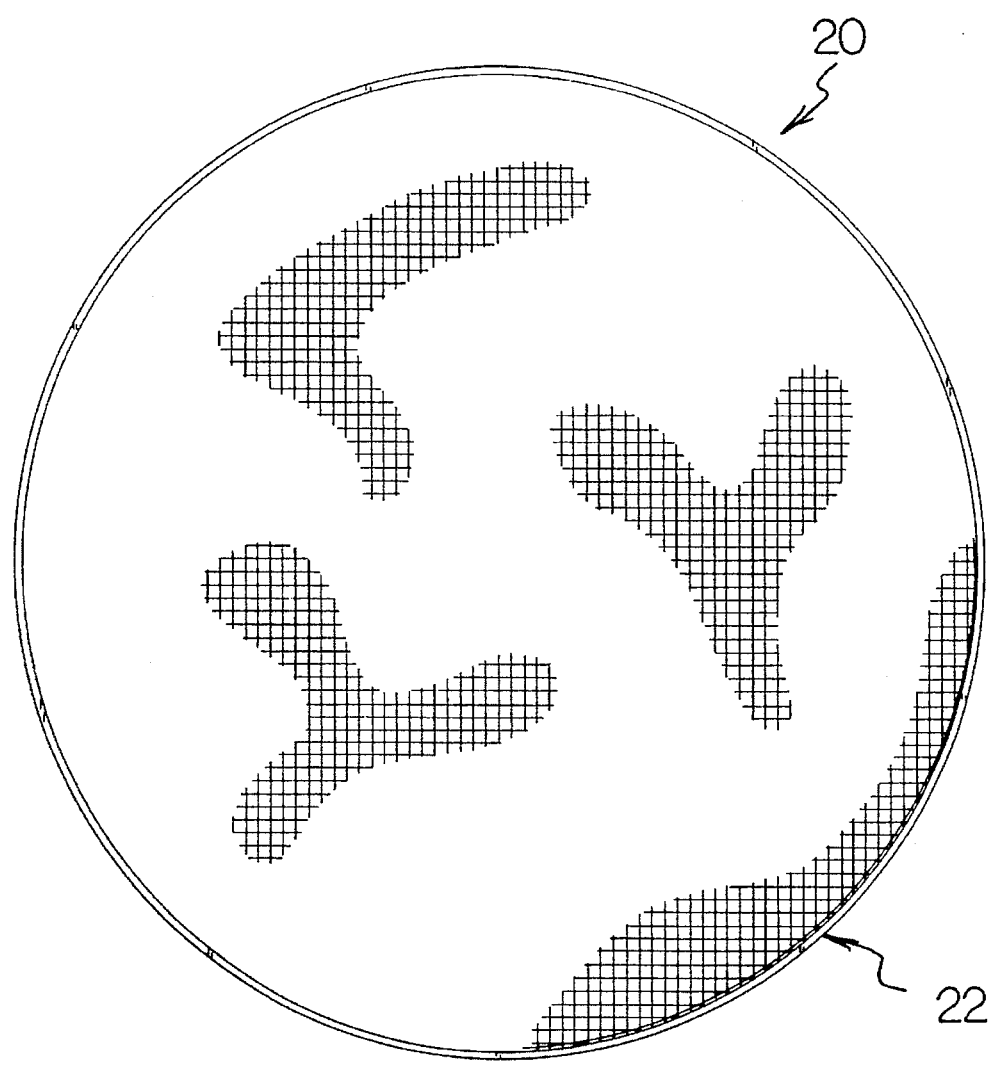
FIG. 3 is a top perspective view of an alternative embodiment of the apparatus illustrating the rubber band.
Figure 4:
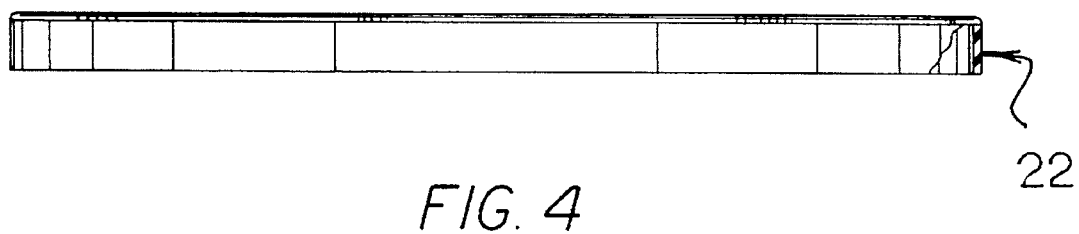
FIG. 4 is a side perspective view of the apparatus illustrating the rubber band.

A first alternate embodiment 20 of the present invention is shown in FIGS. 3 and 4. This embodiment includes substantially all of the components of the present invention, except that the outer binding is formed as a generally circular rubber band 22. Note FIGS. 3 and 4.

Figure 5:
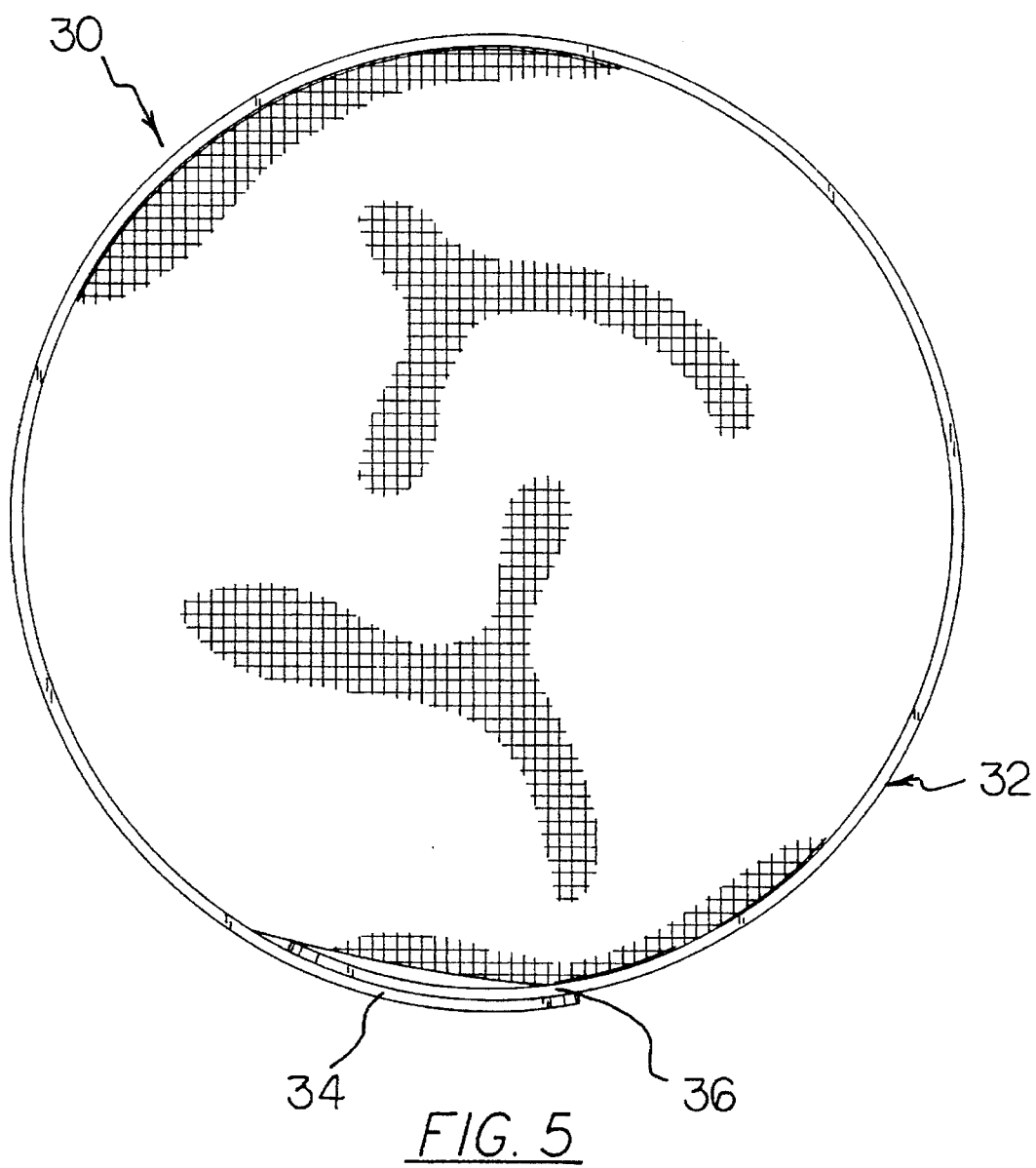
FIG. 5 is a top perspective view of an alternative embodiment of the apparatus illustrating the adjustable band.
Figure 6:
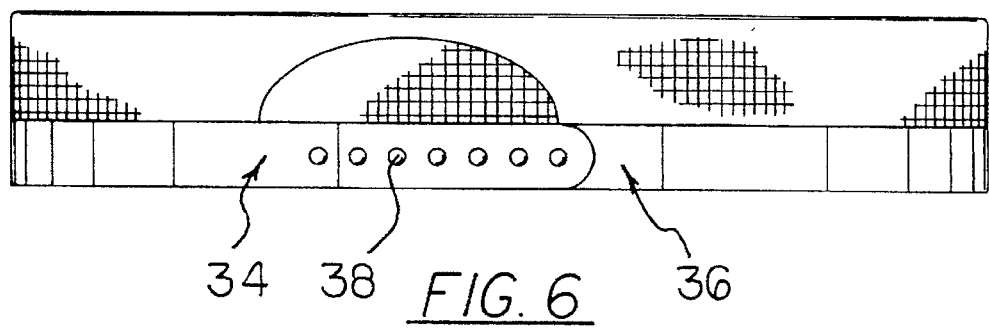
FIG. 6 is a side perspective view of the apparatus illustrating the adjustable band.

A second alternate embodiment 30 of the present invention is shown in FIGS. 5 and 6. This embodiment includes substantially all of the components of the present invention, except that the outer binding is formed as an adjustable plastic band 32. The band has an inboard end 34 which includes a plurality of apertures and a outboard end 36 which has a plurality of detents. In an operative orientation the detents are positioned within the apertures. This creates an overlap of the inboard end upon the outboard end. Note FIGS. 5 and 6.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved fine mesh pre-filter for use in association with an existing swimming pool filter, the apparatus comprising, in combination:

a filter disc being fabricated of fine mesh plastic and formed in a generally circular configuration with a periphery and an outer diameter, the filter disc including a plurality of generally rectangular apertures extending therethrough; and an outer binding fabricated of plastic and formed as a generally circular adjustable band, the band having an inboard end including a plurality of apertures and a outboard end having a plurality of detents, in an operative orientation the detents being positioned within the apertures, in an operative orientation the filter disc being postioned upon an existing pool filter, the outer binding securing the filter disc to the pool filter, the filter disc filtering water before it is filtered by the pool filter thereby minimizing contamination of the existing pool filter.

* * * * *